(12) United States Patent
Li et al.

(10) Patent No.: US 10,977,822 B2
(45) Date of Patent: Apr. 13, 2021

(54) FINGERPRINT IMAGE ENHANCEMENT METHOD AND FINGERPRINT IMAGE MODULE

(71) Applicant: SHENZHEN GOODIX TECHNOLOGY CO., LTD., Guangdong (CN)

(72) Inventors: Chung-Te Li, Guangdong (CN); Chieh-Wei Lo, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 80 days.

(21) Appl. No.: 16/657,730

(22) Filed: Oct. 18, 2019

(65) Prior Publication Data

US 2020/0051276 A1 Feb. 13, 2020

Related U.S. Application Data

(63) Continuation of application No. PCT/CN2017/114261, filed on Dec. 1, 2017.

(51) Int. Cl.
  *G06T 7/73* (2017.01)
  *G06K 9/00* (2006.01)
  *G06K 9/62* (2006.01)

(52) U.S. Cl.
  CPC ............ *G06T 7/73* (2017.01); *G06K 9/00026* (2013.01); *G06K 9/6292* (2013.01)

(58) Field of Classification Search
  None
  See application file for complete search history.

(56) References Cited

U.S. PATENT DOCUMENTS 6,731,780 B2  5/2004  Kobayashi et al.
7,308,123 B2  12/2007  Fenrich et al.
(Continued)

FOREIGN PATENT DOCUMENTS

CN    102103692 A    6/2011
CN    105095887 A    11/2015
(Continued)

OTHER PUBLICATIONS

"Two-Stage Enhancement Scheme for Low-Quality Fingerprint Images by Learning From the Images," Jucheng Yang, Naixue Xiong, Member, IEEE, and Athanasios V. Vasilakos, Senior MEmber, IEEE, IEEE Transactions on Human-Machine Systems, vol. 43, No. 2, Mar. 2013.

(Continued)

*Primary Examiner* — Fayyaz Alam
(74) *Attorney, Agent, or Firm* — WPAT, P.C., Intellectual Property Attorneys; Anthony King (57) ABSTRACT

A fingerprint image enhancement method, comprising: receiving a fingerprint image; computing a horizontal variation image and a vertical variation image of the fingerprint image (300); computing a weighted image, wherein a weighted value of a first pixel corresponding to a finger ridge in the weighted image is greater than a weighted value of a second pixel corresponding to a finger valley (304); multiplying the horizontal variation image with the weighted image to generate a weighted horizontal variation image, and multiplying the vertical variation image with the weighted image to generate a weighted vertical variation image (306); computing a fingerprint orientation image according to the weighted horizontal variation image and the weighted vertical variation image (308); and performing fingerprint image enhancement on the fingerprint image according to the fingerprint orientation image (310).

18 Claims, 3 Drawing Sheets

(56) References Cited

U.S. PATENT DOCUMENTS

| | | | | |
|---|---|---|---|---|
| 8,391,568 | B2* | 3/2013 | Satyan | G06K 9/00026 |
| | | | | 382/124 |
| 2008/0075331 | A1* | 3/2008 | Sakurai | G06K 9/00013 |
| | | | | 382/115 |
| 2013/0142405 | A1* | 6/2013 | Nada | G06K 9/001 |
| | | | | 382/124 |
| 2018/0276443 | A1* | 9/2018 | Strohmann | G06K 9/0002 |
| 2020/0285882 | A1* | 9/2020 | Skovgaard Christensen | |
| | | | | G06K 9/0008 |

FOREIGN PATENT DOCUMENTS

| | | |
|---|---|---|
| CN | 106156726 A | 11/2016 |
| WO | WO2019/104719 A1 | 6/2019 |

OTHER PUBLICATIONS

Application of Method for Getting Direction Image Based on Gradient in Fingerprint Preprocessing, Jing Li, Jian-min Ma, Xinhui Wu (p. 250-253).
"A Novel Scheme for Fingerprint Enhancement," M.F. Fahmy and M.A. Thabet.
English Abstract Translation of Foreign Reference CN102103692A.
English Abstract Translation of Foreign Reference CN105095887A.
English Abstract Translation of Foreign Reference CN106156726A.
International Search Report in Chinese (Form PCT/ISA/210).

* cited by examiner

FINGERPRINT IMAGE ENHANCEMENT METHOD AND FINGERPRINT IMAGE MODULE

CROSS-REFERENCE TO RELATED APPLICATIONS

The present application is a continuation of international application No. PCT/CN2017/114261, filed on Dec. 1, 2017, of which is incorporated herein by reference in its entirety.

TECHNICAL FIELD

The present application is related to a fingerprint image enhancement method and a fingerprint image module; in particular, to a fingerprint image enhancement method and fingerprint image module capable of determining fingerprint orientation correctly.

BACKGROUND

With the advancement of technology, mobile phones, digital cameras, tablet computers, notebook computers and other portable electronic devices have become indispensable to our daily lives. Since portable electronic devices are mostly for personal uses, they contain a certain level of private information, and hence, the data stored therein, such as the contacts, photos, personal information, etc. are privately owned. Once the electronic device is lost, these data may be used by others, thereby resulting in unnecessary losses and damages. Although one can use the password protection to prevent others from using the electronic device, passwords can be leaked or cracked easily, and hence the security level of password protection is relatively low. Also, users have to remember the password in order to use electronic devices, and if the user forgets his/her password, it will cause a lot of inconvenience. Therefore, personal fingerprint identification systems have been developed to achieve the purpose of authentication so as to enhance data security.

On the other hand, with the advancement of fingerprint identification technology, invisible fingerprint sensors (IFS) have gained increasing favor from consumers, gradually. In the invisible fingerprint sensor technology, an optical fingerprint sensor may be disposed under the touch screen (i.e., an under-display fingerprint sensing). In other words, the user can press through the touch screen for implementing fingerprint identification.

Moreover, the current technology has developed the technology for performing fingerprint image enhancement according to the fingerprint orientation, which may enhance the fingerprint image, so as to improve the accuracy of identification. However, the user may have some scars or defects on his/her finger due to injury, thereby causing the misjudgment when determining the fingerprint orientation, and such erroneous fingerprint orientation will deteriorate the performance of the fingerprint image enhancement.

In view of the foregoing, there exists a need in the related art for further improvement.

BRIEF SUMMARY OF THE INVENTION

In view of the foregoing, the purpose of some embodiments of the present invention is to provide a fingerprint image enhancement method and fingerprint image module capable of determining fingerprint orientation correctly, so as to address the disadvantages in the existing art.

To address the above-mentioned technical issues, embodiments of the present invention provide a fingerprint image enhancement method, which comprises the steps of: receiving a fingerprint image; computing a horizontal variation image and a vertical variation image of the fingerprint image; computing a weighted image, wherein a first pixel weighted value corresponding to a first pixel position in the weighted image is greater than a second pixel weighted value corresponding to a second pixel position, wherein the first pixel position in the fingerprint image corresponds to a finger ridge, and the second pixel position in the fingerprint image corresponds to a finger valley; multiplying the horizontal variation image with the weighted image to generate a weighted horizontal variation image, and multiplying the vertical variation image with the weighted image to generate a weighted vertical variation image; computing a fingerprint orientation image according to the weighted horizontal variation image and the weighted vertical variation image; and performing fingerprint image enhancement on the fingerprint image according to the fingerprint orientation image.

For example, when the pixel value corresponding to the finger ridge in the fingerprint image is smaller than the pixel value corresponding to the finger valley in the fingerprint image, the pixel weighted value corresponding to a pixel position in the weighted image increases as the pixel value corresponding to the pixel position in the fingerprint image decreases.

For example, when the pixel value corresponding to the finger ridge in the fingerprint image is greater than the pixel value corresponding to the finger valley in the fingerprint image, the pixel weighted value corresponding to a pixel position in the weighted image increases as the pixel value corresponding to the pixel position in the fingerprint image increases.

For example, the step of computing the weighted image comprises: computing the pixel weighted value corresponding to a pixel position in the weighted image as the maximum value between mean(I)+a*var(I)−$I_{i,j}$ and 0; wherein, I represents the fingerprint image, $I_{i,j}$ represents the pixel value at the pixel position in the fingerprint image, mean(I) represents an averaging value of the fingerprint image, var(I) represents the variance of the fingerprint image, and a represents a constant.

For example, the step of computing the fingerprint orientation image according to the weighted horizontal variation image and the weighted vertical variation image comprises: computing the pixel fingerprint orientation corresponding to a pixel position in the fingerprint orientation image as $c*\tan^{-1}([G_{y,w}]_{i,j}/[G_{x,w}]_{i,j})$; wherein, $[G_{y,w}]_{i,j}$ represents the weighted vertical variation corresponding to the pixel position in the weighted vertical variation image, $[G_{x,w}]_{i,j}$ represents the weighted horizontal variation corresponding to the pixel position in the weighted horizontal variation image, $\tan^{-1}$ represents an inverse function of a tangent function, and c represents a constant.

For example, the step of, computing the fingerprint orientation image according to the weighted horizontal variation image and the weighted vertical variation image comprise: performing a smoothing operation to the weighted horizontal variation image and the weighted vertical variation image to generate a smoothed weighted horizontal variation image and a smoothed weighted vertical variation image; and computing the fingerprint orientation image according to the smoothed weighted horizontal variation image and the smoothed weighted vertical variation image; wherein, the pixel fingerprint orientation corresponding to a pixel position in the fingerprint orientation image is $c*\tan^{-1}([G_{y,S}]_{i,j}/[G_{x,S}]_{i,j})$; wherein, $[G_{y,S}]_{i,j}$ represents the smoothed weighted vertical variation corresponding to the pixel position in the smoothed weighted vertical variation image, $[G_{x,S}]_{i,j}$ represents the smoothed weighted horizontal variation corresponding to the pixel position in the smoothed weighted horizontal variation image, $\tan^{-1}$ represents an inverse function of a tangent function, and c represents a constant.

The present application uses the weighted image to increase the weight/confidence level at positions corresponding to the finger ridge and at the same time decrease the weight/confidence level at positions corresponding to the finger valley, so that it is feasible to accurately reflect the true fingerprint orientation without being subject to the influence of the defects in the fingerprint when computing the fingerprint orientation, thereby improving the performance of the fingerprint image enhancement.

DETAILED DESCRIPTION

To further explain the purposes, technical solutions and advantages of the present application, the appended drawings and embodiments are discussed below to give a detailed description of the present invention. It should be noted that the embodiments provided herein are used to explain the present invention, and shall not be used to limit the present application.

In the specification and claims of the present invention, image A can be considered as a matrix, wherein the pixel value $A_{i,j}$ at the $(i,j)^{th}$ pixel position in the image A is the element at the $(i,j)^{th}$ position in the matrix, and implementing the multiplication between an image A and an image B means implementing the multiplication between the elements of the image A and image B. More specifically, multiplying the image A with image B (denoting as A*B) means multiplying the $(i,j)^{th}$ pixel value $A_{i,j}$ of the image A with the $(i,j)^{th}$ pixel value $B_{i,j}$ of the image B. The averaging value of the image A means the pixel value obtained by averaging all the pixel values of the image A. A variance of image A represents the variance obtained by performing the analysis of variance to all pixels in image A.

Since the defects or scars in the fingerprint resemble the characteristics of the finger valley, the present invention decreases the confidence level/weight at positions corresponding to the finger valley while at the same time increases the confidence level/ weight at positions corresponding to the finger ridge, so as to address the disadvantages of misjudging the fingerprint orientation caused by the defects in the fingerprint when computing the fingerprint orientation using the current technology.

Figure 1:
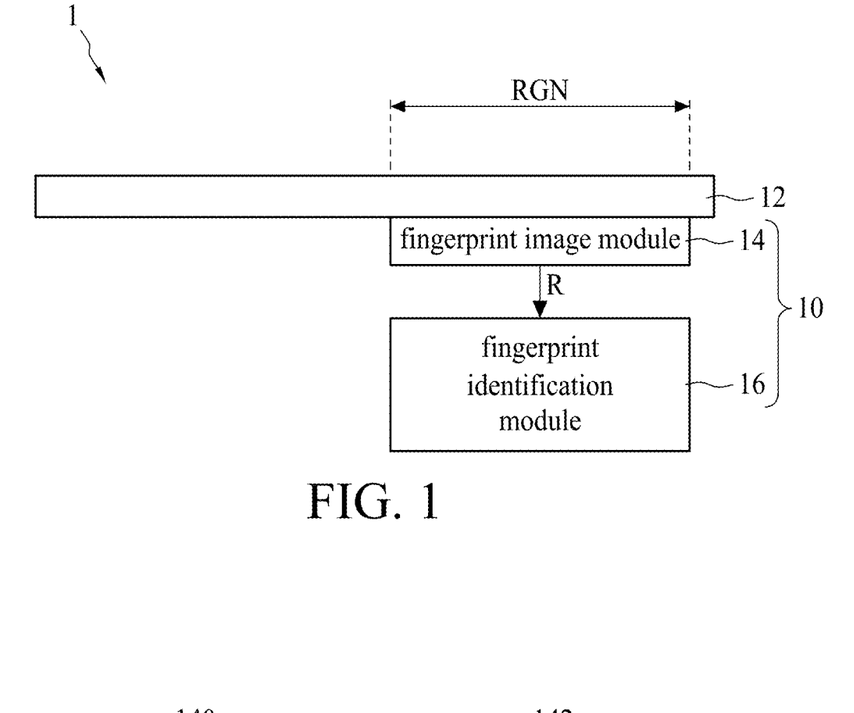
FIG. 1 is a schematic diagram of an electronic device according to embodiments of the present application.
Figure 2:
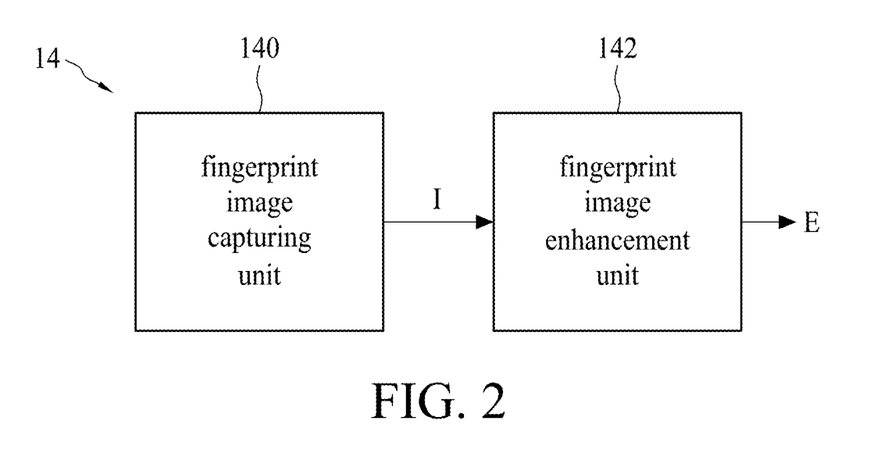
FIG. 2 is a schematic diagram of a fingerprint image module according to embodiments of the present application.

Specifically, reference is made to FIG. 1 and FIG. 2; FIG. 1 is a schematic diagram of an electronic device 1 according to embodiments of the present application, and FIG. 2 is a schematic diagram of a fingerprint image module 14 according to embodiments of the present application. The electronic device 1 may be a smart phone or a tablet computer, which comprises an optical fingerprint identification system 10 and a touch screen 12; the optical fingerprint identification system 10 comprises a fingerprint image module 14 and a fingerprint identification module 16; the fingerprint image module 14 comprises a fingerprint image capturing unit 140 and a fingerprint image enhancement unit 142. The fingerprint image module 14 is disposed under the touch screen 12 and coupled to the fingerprint identification module 16, The optical fingerprint identification system 10 may perform under-display fingerprint sensing; that is, the user may perform fingerprint identification by pressing the touch screen 14.

More specifically, the fingerprint image capturing unit 140 of the image module 14 is disposed under the touch screen 12 directly, and the fingerprint enhancement unit 142 may be disposed under the fingerprint image capturing unit 140 or at other positions (but still under the touch screen 12). The fingerprint image capturing unit 140 may comprise a plurality of light-sensing devices (e.g., photo diodes (PD)) arranged in an array, and fingerprint image capturing unit 140 is configured to capture the image formed on plurality of light-sensing devices by the light reflected by the touch screen 12 from the region RCN to generate a fingerprint image I, The fingerprint enhancement unit 142 may be implemented using a digital circuit, a digital signal processor (DSP) or an application processor (AP), and the fingerprint enhancement unit 142 receives the fingerprint image I captured by the fingerprint image capturing unit 140 and perform fingerprint image enhancement computation on the fingerprint image II captured by the fingerprint image capturing unit 140 so as to generate an enhanced fingerprint image E; in this way, the fingerprint identification module 16 may perform fingerprint identification on the enhanced fingerprint image E.

Figure 3:
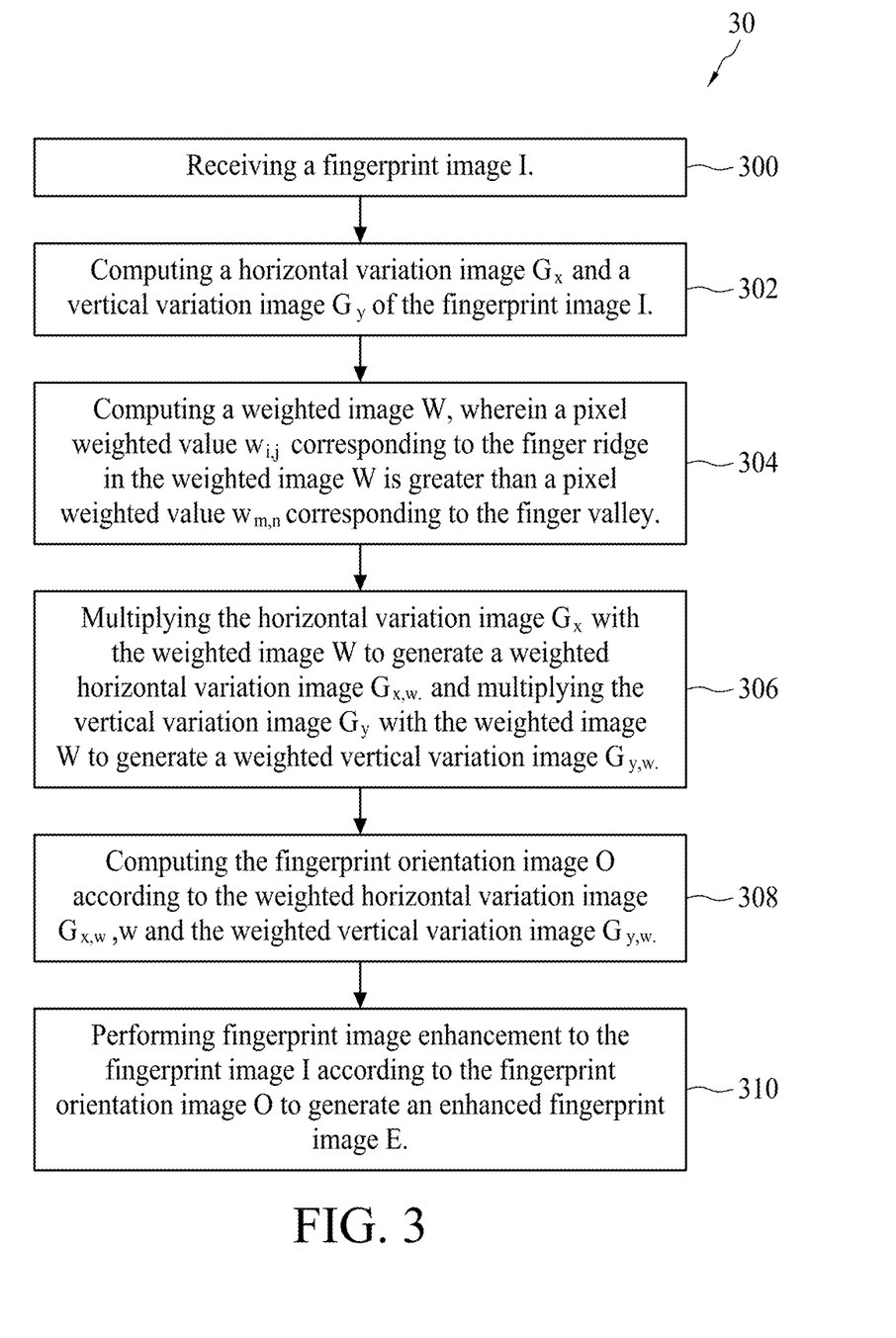
FIG. 3 is a schematic diagram of a fingerprint image enhancement process according to embodiments of the present application.

Please refer to FIG. 3; FIG. 3 is a schematic diagram of a fingerprint image enhancement process 30 according to embodiments of the present application, wherein the fingerprint image enhancement process 30 may be implemented by the fingerprint image enhancement unit 142 to generate an enhanced fingerprint image E, and the fingerprint image enhancement process 30 comprises the following steps:

Step 300: Receiving a fingerprint image I.

Step 302: Computing a horizontal variation image $G_x$ and a vertical variation image $G_y$ of the fingerprint image I.

Step 304: Computing a weighted image W, wherein a pixel weighted value $w_{i,j}$ corresponding to the finger ridge in the weighted image W is greater than a pixel weighted value $w_{m,n}$ corresponding to the finger valley.

Step 306: Multiplying the horizontal variation image $G_x$ with the weighted image W to generate a weighted horizontal variation image $G_{x,w}$, and multiplying the vertical variation image $G_y$ with the weighted image W to generate a weighted vertical variation image $G_{y,w}$.

Step 308: Computing the fingerprint orientation image O according to the weighted horizontal variation image $G_{x,w}$ and the weighted vertical variation image $G_{y,w}$.

Step 310: Performing fingerprint image enhancement corresponding to the fingerprint image I to generate an enhanced fingerprint image E according to the fingerprint orientation image O.

In Step 302, the fingerprint image enhancement unit 142 computes a horizontal variation image $G_x$ and a vertical variation image $G_y$ of the fingerprint image I. The horizontal variation image $G_x$ may be considered as an element in a matrix, which represents the horizontal variation (or horizontal variation) of the fingerprint image I. More specifically, the horizontal variation $[G_x]_{i,j}$ corresponding to the $(i,j)^{th}$ pixel position in the horizontal variation image $G_x$ is the subtraction result of the pixel value $I_{i,j}$ corresponding to the $(i,j)^{th}$ pixel position in the fingerprint image I and the pixel value of the pixel to the left or to the right of the $(i,j)^{th}$ pixel position; for example, the horizontal variation $[G_x]_{i,j}$ may be one of $I_{i,j}-I_{i,j-1}$, $I_{i,j}-I_{i,j+1}$, $I_{i,j-1}-I_{i,j}$ or $I_{i,j+1}-I_{i,j}$. Similarly, the vertical variation image $G_y$ may be considered as an element in a matrix, which represents the vertical variation (or the vertical variation) of the fingerprint image I; the vertical variation $[G_y]_{i,j}$ corresponding to the $(i,j)_{th}$ pixel position in the vertical variation image $G_y$ is the subtraction result of the pixel value $I_{i,j}$ corresponding to the $(i,j)^{th}$ pixel position in the fingerprint image I and the pixel value of the pixel to the top or bottom of the $(i,j)^{th}$ pixel position; for example, the vertical variation $[G_y]_{i,j}$ may be one of $I_{i,j}-I_{i-1,j}$, $I_{i,j}-I_{i+1,j}$, $I_{i-1,j}-I_{i,j}$ or $I_{i+1,j}-I_{i,j}$.

In Step 304, the fingerprint image enhancement unit 142 computes a weighted image W (which can be considered as a matrix); it should be noted that in weighted image W, a pixel weighted value $w_{i,j}$ corresponding to the finger ridge should be greater than a pixel weighted value $w_{m,n}$ corresponding to the finger valley, wherein the pixel weighted value $w_{i,j}$ is the pixel weighted value corresponding to the $(i,j)^{th}$ pixel position in the weighted image W and the $(i,j)^{th}$ pixel position is the pixel position corresponding to the finger ridge in the fingerprint image I, whereas the pixel weighted value $w_{m,n}$ is the pixel weighted value corresponding to the $(m,n)^{th}$ pixel position in the weighted image W, and the $(m,n)^{th}$ pixel position is the pixel position corresponding to the finger valley in the fingerprint image.

In one embodiment, the fingerprint image I is the image formed by using the fingerprint image capturing unit 140 to capture/shoot the user's fingerprint directly, wherein the fingerprint image I is black at the finger ridge and white at the finger valley; in other words, the finger ridge pixel value of the fingerprint image I at the finger ridge is lower than the finger valley pixel value of the fingerprint image I at the finger valley (that is, the finger ridge pixel value is smaller than the finger valley pixel value). In this case, the pixel weighted value $w_{i,j}$ corresponding to the $(i,j)^{th}$ pixel position in the weighted image W decreases as the pixel value $I_{i,j}$ increases. For example, the fingerprint image enhancement unit 142 may compute the pixel weighted value $w_{i,j}$ as $w_{i,j}=\max(\text{mean}(I)+a*\text{var}(I)-I_{i,j}, 0$ (Equation 1), wherein max (•) is an operation of taking the maximum value, mean(I) represents an averaging value of the fingerprint image I, var(I) represents the variance of the fingerprint image I, and a represents a constant. From Equation 1, when the pixel value $I_{i,j}$ is greater than mean(I)+a*var(I) (the larger the pixel value $I_{i,j}$, the more it resembles a white pixel, and it is more likely to be the finger valley), the pixel weighted value $w_{i,j}$ is 0. When the pixel value $I_{i,j}$ is between 0 and mean (I)+a*var(I) (the smaller the pixel value $I_{i,j}$ the more it resembles a black pixel, and it is more likely to be the finger ridge), the pixel weighted value $w_{i,j}$ increases as the pixel value $I_{i,j}$ decreases.

On the other hand, in another embodiment, the fingerprint image I is the resultant image of performing an inverse operation to the image formed by using the fingerprint image capturing unit 140 to capture/shoot the user's fingerprint; in this case, the fingerprint image I is white at the finger ridge and black at the finger valley; in other words, the finger ridge pixel value of the fingerprint image I at the finger ridge is higher than the finger valley pixel value of the fingerprint image I at the finger valley (that is, the finger ridge pixel value is greater than finger valley pixel value). In this case, the pixel weighted value $w_{i,j}$ corresponding to the $(i,j)^{th}$ pixel position in the weighted image W increases as the pixel value $I_{i,j}$ increases. For example, the fingerprint image enhancement unit 142 may compute the pixel weighted value $W_{i,j}$ as $w_{i,j}=\max(\text{mean}(I)+a*\text{var}(I), I_{i,j})$ (Equation 2).

In Step 306, the fingerprint image enhancement unit 142 computes a weighted horizontal variation image $G_{x,w}$ as $G_{x,w}=G_x*W$, and computes a weighted vertical variation image $G_{y,w}$ as $G_{y,x}=G_y*W$.

In Step 308, the fingerprint image enhancement unit 142 computes a fingerprint orientation image O according to the weighted horizontal variation image $G_{x,w}$ and the weighted vertical variation image $G_{y,w}$. In one embodiment, the fingerprint image enhancement unit 142 may use the horizontal variation image $G_{x,w}$ and the weighted vertical variation image $G_{y,w}$ directly to compute the fingerprint orientation image O; that is, the fingerprint image enhancement unit 142 may compute the pixel fingerprint orientation $O_{i,j}$ corresponding to the $(i,j)^h$ pixel position in the fingerprint orientation image O as $O_{i,j}=c*\tan^{-1}([G_{y,w}]_{i,j}/[G_{x,w}]_{i,j})$, wherein $[G_{y,w}]_{i,j}$ represents the weighted vertical variation corresponding to the $(i,j)^{th}$ pixel position in the weighted vertical variation image $G_{y,w}$ (i.e., the pixel value corresponding to the $(i,j)^{th}$ pixel position in the weighted vertical variation image $G_{x,w}$). $[G_{x,w}]_{i,j}$ represents the weighted horizontal variation corresponding to the $(i,j)^{th}$ pixel position in the weighted horizontal variation image $G_{x,w}$ (i.e., the pixel value corresponding to the $(i,j)^{th}$ pixel position in the weighted horizontal variation image $G_{x,w}$), $\tan^{-1}$ represents an inverse function of a tangent function, and c represents a constant.

In another embodiment, the fingerprint image enhancement unit 142 may first perform a smoothing operation (e.g., Gaussian smoothing) on the weighted horizontal variation image $G_{x,w}$ and the weighted vertical variation image $G_{y,w}$ to generate a smoothed weighted horizontal variation image $G_{x,S}$ and a smoothed weighted vertical variation image $G_{y,S}$, and then compute the fingerprint orientation image O according to the smoothed weighted horizontal variation image $G_{x,S}$ and the smoothed weighted vertical variation image $G_{y,S}$. In this case, performing the smoothing operation (e.g., Gaussian smoothing) is well-known to persons having ordinary skill in the art, and hence a detailed description thereof is omitted herein. Similarly, the fingerprint image enhancement unit 142 may compute the pixel fingerprint orientation $O_{i,j}$ corresponding to the $(i,j)^{th}$ pixel position in the fingerprint orientation image O as $O_{i,j}=c*\tan^{-1}([G_{y,S}]_{i,j}/[G_{x,S}]_{i,j})$, wherein $[G_{y,S}]_{i,j}$ represents the smoothed weighted vertical variation/pixel value corresponding to the $(i,j)^{th}$ pixel position in the smoothed weighted vertical variation image $G_{y,S}$, $[G_{x,S}]_{i,j}$ represents the smoothed weighted horizontal variation/pixel value corresponding to the $(i,j)^{th}$ pixel position in the smoothed weighted horizontal variation image $G_{x,S}$.

After obtaining the fingerprint orientation image O, in Step 310, the fingerprint image enhancement unit 142 can then perform fingerprint image enhancement to the fingerprint image I according to the fingerprint orientation image O to generate an enhanced fingerprint image E. The technical detail of the Step 310 is well-known to persons having ordinary skill in the art, and hence a detailed description thereof is omitted herein.

In view of the foregoing, the present invention uses the weighted image W to increase the weight/confidence level at positions corresponding to the finger ridge and to decrease the weight/confidence level at positions corresponding to the finger valley. In this way, the fingerprint orientation image O computed according to the weighted horizontal variation image $G_{x,w}$ and the weighted vertical variation image $G_{y,w}$ can accurately reflect the true fingerprint orientation.

Figure 4:
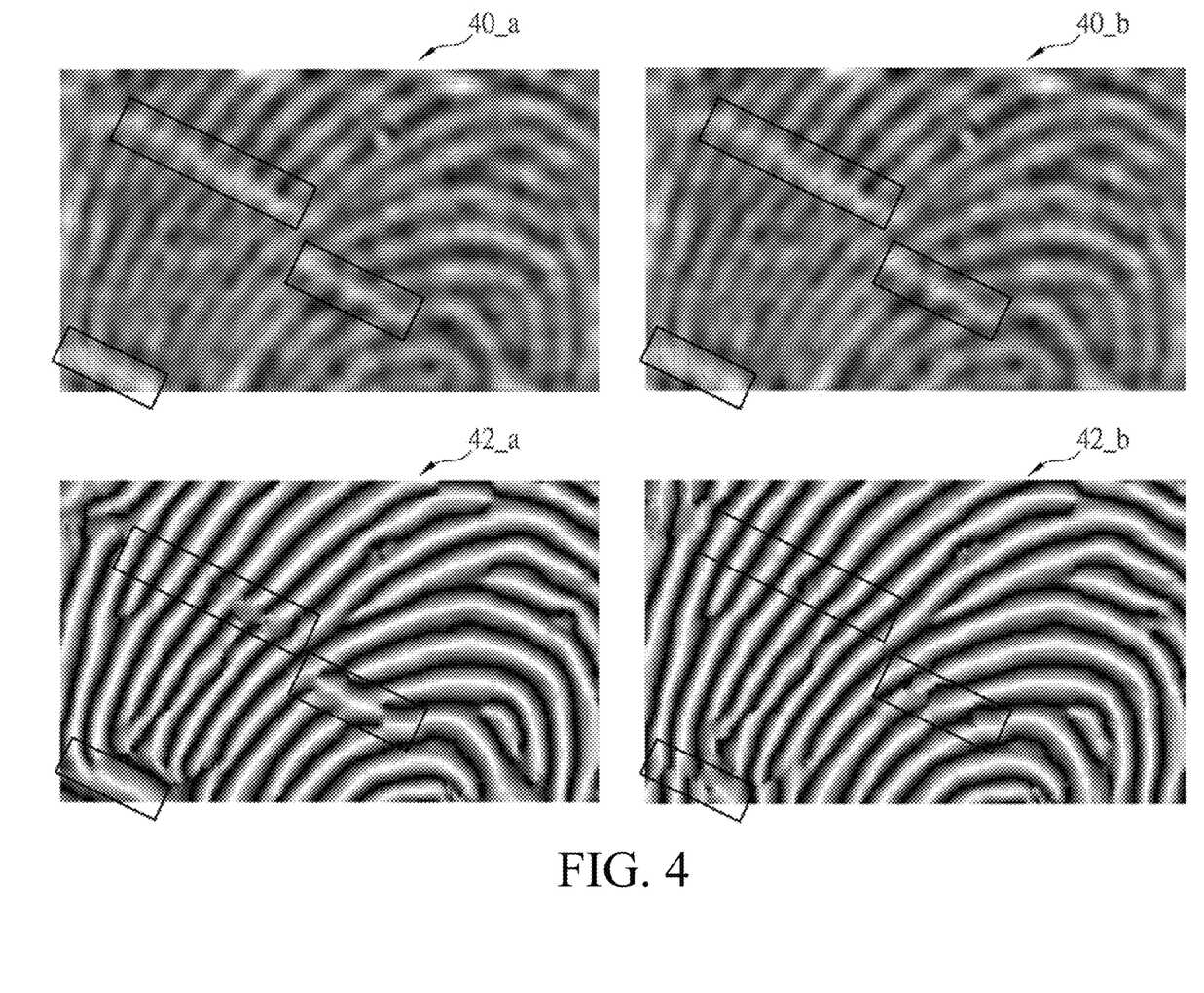
FIG. 4 is a schematic diagram of a plurality of images according to embodiments of the present application.

Reference is made to FIG. 4; the frame 40_a in FIG. 4 is a schematic diagram of the fingerprint orientation image $O_{pri\text{-}art}$ computed from the fingerprint image I simply according to the horizontal variation image $G_x$ and the vertical variation image $G_y$ in the prior art (the fingerprint orientation image $O_{pri\text{-}art}$ is shown in dashed line); the frame 40_b is a schematic diagram of fingerprint orientation image O computed from the according to the weighted horizontal variation image $G_{x,w}$ and the weighted vertical variation image $G_{y,w}$ of the present invention (the fingerprint orientation image O is shown in dashed line); the frame 42_a is an enhanced fingerprint image $E_{pri\text{-}art}$ generated according to the fingerprint orientation image $O_{pri\text{-}art}$ in the prior art; the frame 42_b is an enhanced fingerprint image E generated according to the fingerprint orientation image O of the present invention. In this case, the pixel fingerprint orientation $O_{pri\text{-}art,i,j}$ corresponding to the $(i,j)^{th}$ pixel position in the fingerprint orientation image $O_{pri\text{-}art}$ is $O_{pri\text{-}art,i,j}=c*\tan^{-1}([G_y]_{i,j}/[G_x]_{i,j})$, $[G_y]_{i,j}$ represents the vertical variation/pixel value corresponding to the $(i,j)^{th}$ pixel position in the vertical variation image $G_y$, $[G_x]_{i,j}$ represents the horizontal variation/pixel value corresponding to the $(i,j)^{th}$ pixel position in the horizontal variation image $G_x$. Further, in frames 40_a and 40_b, the user's fingerprint has some defects at the bold black box. As can be seen in frame 40_a, the fingerprint orientation image $O_{pri\text{-}art}$ generated using the conventional technology will suffer from the misjudgment of the fingerprint orientation due to the finger's defects, thereby jeopardizing the effect of fingerprint image enhancement (as shown in frame 42_a). In comparison, as can be seen in frame 40_b, the fingerprint orientation image ) computed according to the present weighted horizontal variation image and the weighted vertical variation image $G_{y,w}$ may accurately estimate the fingerprint orientation without being affected by the fingerprint defects, thereby resulting in a better effect of fingerprint image enhancement (as shown in frame 42_b).

It should be noted that the above-mentioned embodiments are used to explained. the concept of the present invention, and persons having ordinary skill in the art may made various modifications based on the foregoing, and the present inventions are not limited thereto. For example, in Equation 1 (Equation 2), the pixel weighted value $w_{i,j}$ and the pixel value $I_{i,j}$ has a piecewise linear decreasing (increasing) relationship therebetween; however, the present invention is not limited thereto, as long as the pixel weighted value corresponding to the finger ridge is greater than the pixel weighted value corresponding to the finger valley; these variations also fall within the scope of the present invention.

In view of the foregoing, the present invention uses the weighted image to increase the weight/confidence level at positions corresponding to the finger ridge and at the same time decrease the weight/confidence level at positions corresponding to the forger valley. In this way, the present invention uses the weighted horizontal variation image and the weighted vertical variation image according to the weighted image to compute the fingerprint orientation image, so that it is feasible to accurately reflect the true fingerprint orientation without being subject to the influence of the defects in the fingerprint when computing the fingerprint orientation, thereby improving the performance of the fingerprint image enhancement.

The foregoing outlines a portion of embodiments of the present disclosure, and shall not be used to limit the present application; any modification, equivalent substitution or improvement made within the spirits and principles of the present application shall be included in the scope of protection of the present application.

What is claimed is:

1. A fingerprint image enhancement method, comprising:
   receiving a fingerprint image;
   computing a horizontal variation image and vertical variation image of the fingerprint image;
   computing a weighted image, wherein in the weighted image, a first pixel weighted value corresponding to a first pixel position is greater than a second pixel weighted value corresponding to a second pixel position, wherein the first pixel position in the fingerprint image corresponds to a finger ridge, and the second pixel position in the fingerprint image corresponds to a finger valley;
   multiplying the horizontal variation image with the weighted image to generate a weighted horizontal variation image, and multiplying the vertical variation image with the weighted image to generate a weighted vertical variation image;
   computing a fingerprint orientation image according to the weighted horizontal variation image and the weighted vertical variation image; and
   performing fingerprint image enhancement on the fingerprint image according to the fingerprint orientation image.

2. The fingerprint image enhancement method of claim 1, wherein when the pixel value corresponding to the finger ridge in the fingerprint image is smaller than the pixel value corresponding to the finger valley in the fingerprint image, the pixel weighted value corresponding to a pixel position in the weighted image increases as the pixel value corresponding to the pixel position in the fingerprint image decreases.

3. The fingerprint image enhancement method of claim 1, wherein when the pixel value corresponding to the finger ridge in the fingerprint image is greater than the pixel value corresponding to the finger valley in the fingerprint image, the pixel weighted value corresponding to a pixel position in the weighted image increases as the pixel value corresponding to the pixel position in the fingerprint image increases.

4. The fingerprint image enhancement method of claim 1, wherein the step of computing the weighted image comprises:
   computing the pixel weighted value corresponding to a pixel position in the weighted image as the maximum value between mean(I)+a*var(I)-$I_{i,j}$ and 0;
   wherein, I represents the fingerprint image, $I_{i,j}$ represents the pixel value of the fingerprint image at said pixel position, mean(I) represents an averaging value of the fingerprint image, var(I) represents a variance of the fingerprint image, and a represents a constant.

5. The fingerprint image enhancement method of claim 1, the step of computing the fingerprint orientation image according to the weighted horizontal variation image and the weighted vertical variation image comprises:
   computing the pixel fingerprint orientation corresponding to a pixel position in the fingerprint orientation image as $c*\tan^{-1}([G_{y,w}]_{i,j}/[G_{x,w}]_{i,j})$;
   wherein, $[G_{y,w}]_{i,j}$ represents the weighted vertical variation corresponding to the pixel position in the weighted vertical variation image, $[G_{x,w}]_{i,j}$ represents the weighted horizontal variation corresponding to the pixel position in the weighted horizontal variation image, $\tan^{-1}$ represents an inverse function of a tangent function, and c represents a constant.

6. The fingerprint image enhancement method of claim 1, the step of computing the fingerprint orientation image according to the weighted horizontal variation image and the weighted vertical variation image comprises:

performing a smoothing operation to the weighted horizontal variation image and the weighted vertical variation image to generate a smoothed weighted horizontal variation image and a smoothed weighted vertical variation image; and computing the fingerprint orientation image according to the smoothed weighted horizontal variation image and the smoothed weighted vertical variation image;

wherein, the pixel fingerprint orientation corresponding to a pixel position in the fingerprint orientation image is $c*\tan^{-1}([G_{y,S}]_{i,j}/[G_{x,S}]_{i,j})$;

wherein, $[G_{y,S}]_{i,j}$ represents the smoothed weighted vertical variation corresponding to the pixel position in the smoothed weighted vertical variation image, $[G_{x,S}]_{i,j}$ represents the smoothed weighted horizontal variation corresponding to the pixel position in the smoothed weighted horizontal variation image, $\tan^{-1}$ represents an inverse function of a tangent function, and c represents a constant.

7. A fingerprint image module, comprising:
a fingerprint image capturing unit, configured to generate a fingerprint image;
a fingerprint image enhancement unit, coupled to the fingerprint image capturing unit to receive the fingerprint image, and configured to perform the following steps:
computing a horizontal variation image and vertical variation image of the fingerprint image;
computing a weighted image, wherein in the weighted image, a first pixel weighted value corresponding to a first pixel position is greater than a second pixel weighted value corresponding to a second pixel position, wherein the first pixel position in the fingerprint image corresponds to a finger ridge, and the second pixel position in the fingerprint image corresponds to a finger valley;
multiplying the horizontal variation image with the weighted image to generate a weighted horizontal variation image, and multiplying the vertical variation image with the weighted image to generate a weighted vertical variation image;
computing a fingerprint orientation image according to the weighted horizontal variation image and the weighted vertical variation image; and
generating an enhanced fingerprint image corresponding to the fingerprint image by performing fingerprint image enhancement according to the fingerprint orientation image.

8. The fingerprint image module of claim 7, wherein when the pixel value corresponding to the finger ridge in the fingerprint image is smaller than the pixel value corresponding to the finger valley in the fingerprint image, the pixel weighted value corresponding to a pixel position in the weighted image increases as the pixel value corresponding to the pixel position in the fingerprint image decreases.

9. The fingerprint image module of claim 7, wherein when the pixel value corresponding to the finger ridge in the fingerprint image is greater than the pixel value corresponding to the finger valley in the fingerprint image, the pixel weighted value corresponding to a pixel position in the weighted image increases as the pixel value corresponding to the pixel position in the fingerprint image increases.

10. The fingerprint image module of claim 7, wherein the fingerprint image enhancement unit is further configured to compute the weighted image by:

computing the pixel weighted value corresponding to a pixel position in the weighted image as the maximum value between mean(I)+a*var(I)-$I_{i,j}$ and 0;
wherein, I represents the fingerprint image, $I_{i,j}$ represents the pixel value of the fingerprint image at said pixel position, mean(I) represents an averaging value of the fingerprint image, var(I) represents a variance of the fingerprint image, and a represents a constant.

11. The fingerprint image module of claim 7, wherein the fingerprint image enhancement unit is further configured to compute the fingerprint orientation image according to the weighted horizontal variation image and the weighted vertical variation image by:

computing the pixel fingerprint orientation corresponding to a pixel position in the fingerprint orientation image as $c*\tan^{-1}([G_{y,w}]_{i,j}/[G_{x,w}]_{i,j})$;
wherein, $[G_{y,w}]_{i,j}$ represents the weighted vertical variation corresponding to the pixel position in the weighted vertical variation image, $[G_{x,w}]_{i,j}$ represents the weighted horizontal variation corresponding to the pixel position in the weighted horizontal variation image, $\tan^{-1}$ represents an inverse function of a tangent function, and c represents a constant.

12. The fingerprint image module of claim 7, wherein the fingerprint image enhancement unit is configured to compute the fingerprint orientation image according to the weighted horizontal variation image and the weighted vertical variation image by:

performing a smoothing operation to the weighted horizontal variation image and the weighted vertical variation image to generate a smoothed weighted horizontal variation image and a smoothed weighted vertical variation image; and
computing the fingerprint orientation image according to the smoothed weighted horizontal variation image and the smoothed weighted vertical variation image;
wherein, the pixel fingerprint orientation corresponding to a pixel position in the fingerprint orientation image is $c*\tan^{-1}([G_{y,S}]_{i,j}/[G_{x,S}]_{i,j})$;
wherein, $[G_{y,S}]_{i,j}$ represents the smoothed weighted vertical variation corresponding to the pixel position in the smoothed weighted vertical variation image, $[G_{x,S}]_{i,j}$ represents the smoothed weighted horizontal variation corresponding to the pixel position in the smoothed weighted horizontal variation image, $\tan^{-1}$ represents an inverse function of a tangent function, and c represents a constant.

13. An optical fingerprint identification system, disposed in an electronic device, and the optical fingerprint identification system comprising:
a fingerprint identification module; and
a fingerprint image module, disposed under a touch screen of the electronic device and coupled to the fingerprint identification module, wherein the fingerprint image module comprises:
a fingerprint image capturing unit, configured to generate a fingerprint image;
a fingerprint image enhancement unit, coupled to the fingerprint image capturing unit to receive the fingerprint image, and being configured for:

computing a horizontal variation image and vertical variation image of the fingerprint image, computing a weighted image, multiplying the horizontal variation image with the weighted image to generate a weighted horizontal variation image, and multiplying the vertical variation image with the weighted image to generate a weighted vertical variation image, computing a fingerprint orientation image according to the weighted horizontal variation image and the weighted vertical variation image, and generating an enhanced fingerprint image corresponding to the fingerprint image by performing fingerprint image enhancement according to the fingerprint orientation image;

wherein in the weighted image, a first pixel weighted value corresponding to a first pixel position is greater than a second pixel weighted value corresponding to a second pixel position, wherein the first pixel position in the fingerprint image corresponds to a finger ridge, and the second pixel position in the fingerprint image corresponds to a finger valley;

wherein, the fingerprint identification module receives the enhanced fingerprint image to perform fingerprint identification according to the enhanced fingerprint image.

14. The optical fingerprint identification system of claim 13, wherein when the pixel value corresponding to the finger ridge in the fingerprint image is smaller than the pixel value corresponding to the finger valley in the fingerprint image, the pixel weighted value corresponding to a pixel position in the weighted image increases as the pixel value corresponding to the pixel position in the fingerprint image decreases.

15. The optical fingerprint identification system of claim 13, when the pixel value corresponding to the finger ridge in the fingerprint image is greater than the pixel value corresponding to the finger valley in the fingerprint image, the pixel weighted value corresponding to a pixel position in the weighted image increases as the pixel value corresponding to the pixel position in the fingerprint image increases.

16. The optical fingerprint identification system of claim 13, wherein the fingerprint image enhancement unit is further configured to compute the weighted image by:

computing the pixel weighted value corresponding to a pixel position in the weighted image as the maximum value between mean(I)+a*var(I)-$I_{i,j}$ and 0;

wherein, I represents the fingerprint image, $I_{i,j}$ represents the pixel value of the fingerprint image at said pixel position, mean(I) represents an averaging value of the fingerprint image, var(I) represents a variance of the fingerprint image, and a represents a constant.

17. The optical fingerprint identification system of claim 13, wherein the fingerprint image enhancement unit is further configured to compute the fingerprint orientation image according to the weighted horizontal variation image and the weighted vertical variation image by:

computing the pixel fingerprint orientation corresponding to a pixel position in the fingerprint orientation image as $c*\tan^{-1}([G_{y,w}]_{i,j}/[G_{x,w}]_{i,j})$;

wherein, $[G_{y,w}]_{i,j}$ represents the weighted vertical variation corresponding to the pixel position in the weighted vertical variation image, $[G_{x,w}]_{i,j}$ represents the weighted horizontal variation corresponding to the pixel position in the weighted horizontal variation image, $\tan^{-1}$ represents an inverse function of a tangent function, and c represents a constant.

18. The optical fingerprint identification system of claim 13, wherein the fingerprint image enhancement unit is configured to compute the fingerprint orientation image according to the weighted horizontal variation image and the weighted vertical variation image by:

performing a smoothing operation to the weighted horizontal variation image and the weighted vertical variation image to generate a smoothed weighted horizontal variation image and a smoothed weighted vertical variation image; and computing the fingerprint orientation image according to the smoothed weighted horizontal variation image and the smoothed weighted vertical variation image;

wherein, the pixel fingerprint orientation corresponding to a pixel position in the fingerprint orientation image is $c*\tan^{-1}([G_{y,s}]_{i,j}/[G_{x,s}]_{i,j})$;

wherein, $[G_{y,s}]_{i,j}$ represents the smoothed weighted vertical variation corresponding to the pixel position in the smoothed weighted vertical variation image, $[G_{x,s}]_{i,j}$ represents the smoothed weighted horizontal variation corresponding to the pixel position in the smoothed weighted horizontal variation image, $\tan^{-1}$ represents an inverse function of a tangent function, and c represents a constant.

* * * * *